UNITED STATES PATENT OFFICE.

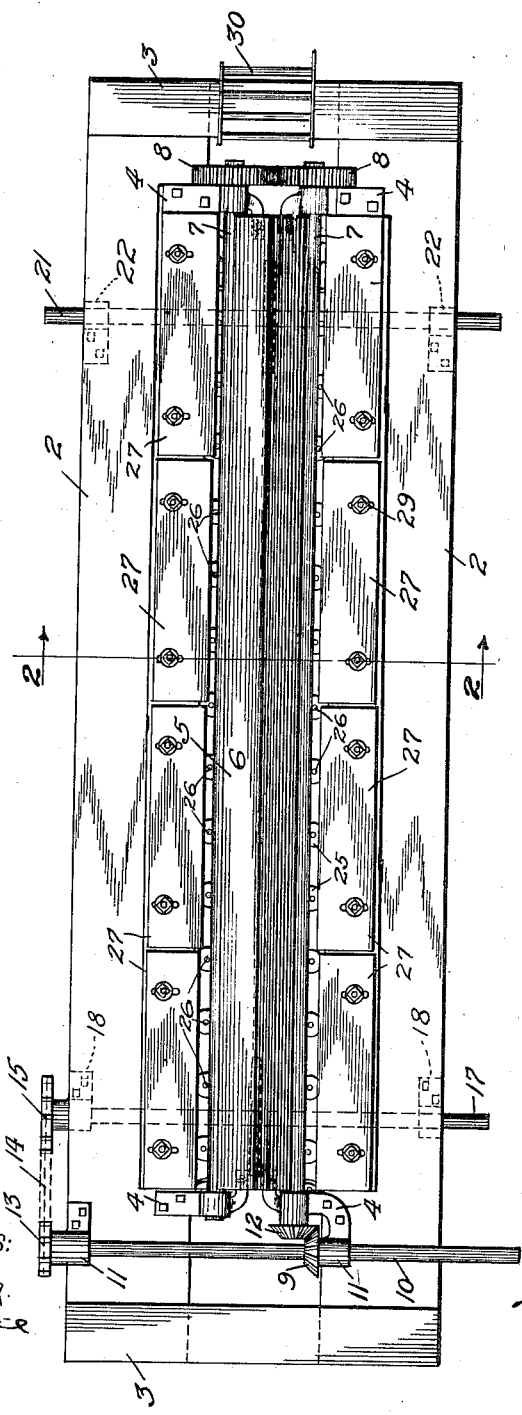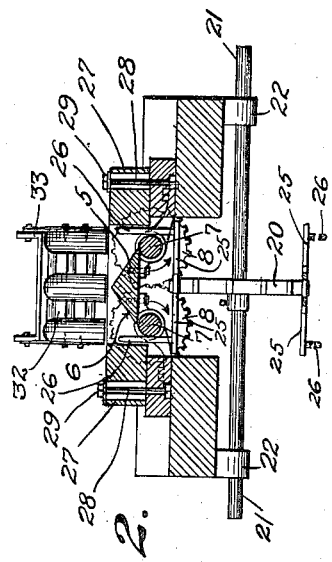

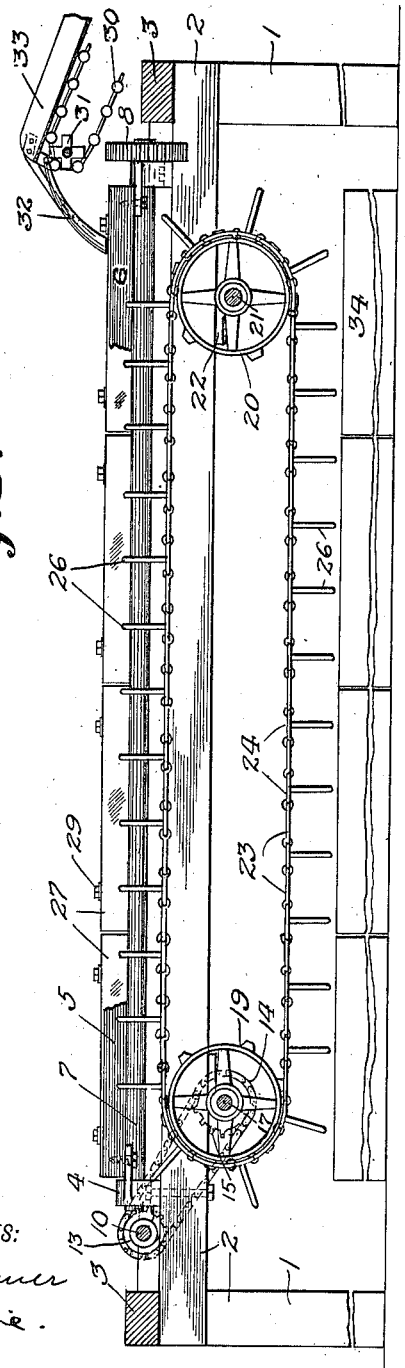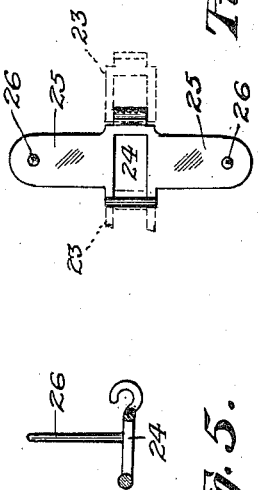

GEORGE D. PARKER, OF RIVERSIDE, CALIFORNIA.

FRUIT-GRADER.

1,139,714.  Specification of Letters Patent.  Patented May 18, 1915.

Application filed July 21, 1914. Serial No. 852,249.

*To all whom it may concern:*

Be it known that I, GEORGE D. PARKER, a citizen of the United States, residing at Riverside, in the county of Riverside and State of California, have invented certain new and useful Improvements in Fruit-Graders, of which the following is a specification.

The present invention relates to improvements in fruit graders, and more particularly to a type of grader for the grading of substantially round fruit, adapted for the grading of olives, oranges, apples, peaches, and fruit generally as to size; and the invention has for its principal objects to provide a sizer which is capable of rapidly and efficiently grading large quantities of fruit within a short period of time; one in which the fruit operated on will not be pinched or bruised, and one in which the sizing means is capable of adjustment to vary the sizes of fruit separated.

The invention consists broadly in an apparatus of the class described, consisting of a fixed guide member and adjustable sizing members, a suitable member between the guide and sizing members to prevent the fruit from becoming bruised or pinched when passing therebetween, and a novel form of conveyer for conveying the fruit to be operated on longitudinally of the sizing members.

With the above mentioned and other objects in view, the invention consists in the novel construction and combination of parts hereinafter described, illustrated in the accompanying sheets of drawings, and pointed out in the claims hereto appended; it being understood that various changes in the form, proportion, size and minor details of construction within the scope of the appended claims may be resorted to without departing from the spirit or sacrificing any of the advantages of the invention.

To more fully comprehend the invention, reference is directed to the accompanying sheets of drawings wherein is disclosed the preferred form of my invention, and in which—

Figure 1 is a top plan view of the invention, disclosing the fixed guide and adjustable sizing members, the rolls between the guide and sizing members and the fruit conveyer. Fig. 2 is a transverse sectional view taken on line 2—2 of Fig. 1. Fig. 3 is a longitudinal sectional view of the invention disclosing more fully the endless conveyer. Fig. 4 is a top plan view of one of the links of the conveyer carrying the conveying pins. Fig. 5 is a side elevation of the link disclosed in Fig. 4.

Referring more particularly to the several views of the drawings, wherein like characters of reference designate corresponding parts throughout the several views, the numerals 1 designate supporting legs carrying the longitudinal side frame members 2 and end members 3, the whole forming a supporting frame. Carried by the supporting frame are suitable brackets 4 which support the ends of a fixed guide member 5 extending longitudinally of the frame in spaced relation to the sides thereof, and formed with oppositely inclined upper surfaces 6 for directing the fruit deposited thereon to the sides thereof.

Rotatably mounted in the brackets 4 are the ends of rollers 7 which extend longitudinally of the fixed guide 5 immediately beneath the longitudinal side edges thereof, as shown in Fig. 2 of the drawings, and said rollers carry at one end intermeshing gears 8 and are driven in the direction of the arrows—Fig. 2, by the beveled gear 9 carried by a power shaft 10 journaled in bearings 11, and said gear 9 intermeshes with a corresponding gear 12 carried on one end of the rollers.

The power shaft 10 receives its power from any suitable source, and carries at one end a sprocket 13 which is connected by a drive chain 14 with a sprocket 15 carried by a shaft 17 rotatably mounted in bearings 18 positioned on the underside of the supporting frame adjacent one end thereof. The shaft 17 carries at a point beneath the fixed guide 5 a sprocket 19 around which operates an endless conveyer chain which operates around and is supported by a sprocket 20 carried by a shaft 21 rotatably mounted in bearings 22 carried on the underside of the supporting frame adjacent the opposite end thereof from bearings 18.

The conveyer chain is composed preferably of pivotally connected alternately arranged links 23 and 24 and the links 24 are formed on each side with laterally projecting arms 25 which carry on one face the conveyer fingers 26 which are adapted to project upwardly on the outer side of the rolls 7 and convey the fruit from the receiving end of the apparatus toward the discharge end thereof.

Adjustably mounted on the side frame members 2 and extending parallel to the outer surface of the rolls 7 are the grading boards 27 composed of independent adjustable sections and each formed adjacent its rear edge with the elongated slots through which project the upwardly extending bolts 28 carried by the side frame members 2, and said bolts carry nuts 29 which when adjusted retain the boards in their adjusted position relative to the rolls 7. The grading boards 27 adjacent the feed end of the apparatus are adjusted to a position closer to the rolls than the next succeeding boards so that the smaller fruit will be the first graded and the larger fruit will not pass between the rolls at this point but will be conveyed longitudinally of the rolls until a sufficiently large aperture has been reached to permit the fruit to pass between the rolls and grader board.

Fruit to be treated is fed to one end of the apparatus by an endless conveyer 30 operating over a suitable support 31 rotatably mounted in any suitable manner over one end of the apparatus, and the fruit is directed onto one end of the apparatus by a suitable runway 32 carried by the side members 33 of the conveyer 30.

The fruit as fed into the feed end of the apparatus drops onto the fixed guide 5 and the beveled surfaces thereof direct the fruit toward the grader boards 27 and the fruit which is of a size sufficiently small to pass between the first set of grader boards 27 and the rolls 7, will drop into the receptacle 34 below the first set of grader boards. The fruit remaining will rest on the rolls 7 and grader boards and will be advanced by the conveyer fingers 26 longitudinally of the rolls until that set of grader boards is reached which are spaced a sufficient distance from the rolls to permit the fruit to drop therebetween. It will be apparent by rotating the rolls in the direction, as in Fig. 2 of the drawings, that the fruit will not be drawn or become wedged between the rolls and grader boards.

It will be apparent that I have provided a fruit grader which is simple in construction, is composed of but few parts, one which may be constructed at little cost, and one which is thoroughly efficient for the purposes described.

Having thus described my invention what I claim as new and desire to protect by Letters Patent is:—

1. An apparatus of the described class, comprising a supporting frame, a stationary guide member supported thereby, rotatably mounted rolls positioned adjacent the longitudinal side edges of said guide member, means for rotating said rolls in a direction toward said stationary guide member, adjustable grader members carried by said supporting frame and extending longitudinally of said rolls in spaced relation, said grader members overlying the sides of the stationary guide member and coöperating therewith to provide a fruit runway of variable width, and an endless conveyer projecting into said fruit runway between the rolls and said grader members for conveying the fruit longitudinally of said runways.

2. An apparatus of the described class, comprising a supporting frame, a stationary guide member supported thereby, a pair of rotatably mounted rolls of substantially the same diameter from end to end, one positioned adjacent each longitudinal side edge of said guide member, and therebelow means for rotating said rolls in a direction toward said stationary guide member, grader members carried by said supporting frame and extending longitudinally of each side edge of said stationary guide in spaced relation to said rolls, said members consisting of a plurality of independently adjustable sections, an endless conveyer supported by said frame, and conveyer fingers carried by said conveyer at spaced intervals and adapted for extending between said rolls and said grader members for conveying the fruit longitudinally of said rolls.

3. An apparatus of the described class, the same comprising a supporting frame, a stationary guide member supported thereby and formed with an upper surface inclined toward the opposite longitudinal side edges thereof, a pair of rotatably mounted rolls, one positioned immediately below the longitudinal side edges of said guide and projecting outwardly beyond the longitudinal side edges thereof, grader members carried by said supporting frame and extending longitudinally of each side edge of said stationary guide member in spaced relation to said rolls, said grader members being of substantially the same length as the stationary guide and coöperating therewith to form a fruit runway of variable width, said members consisting of a plurality of independently adjustable sections, an endless conveyer supported by said frame and provided with means adapted to operate in said fruit runways to convey the fruit therein longitudinally of said runways.

4. An apparatus of the described class, comprising a supporting frame, a stationary guide carried thereby, transversely adjustable end to end grader members supported by said frame and extending longitudinally of the longitudinal side edges of said guide in spaced relation thereto, the said guide and said grader members providing a pair of fruit runways of variable width, a longitudinally disposed rotary member situated within each of the runways and a single conveyer common to both of said runways for conveying the fruit longitudinally thereof.

5. An apparatus of the described class, comprising a supporting frame, a stationary guide supported by said frame, a plurality of independently adjustable grader members supported by said frame and extending longitudinally of the longitudinal side edges of said guide in spaced relation thereto, said guide and grader members providing therebetween a plurality of fruit runways of a variable width for the passage of fruit therethrough, a rotatable roll at the base of each runway and a single conveyer provided with links having transverse projections and upwardly extending arms projecting through said runways for conveying the fruit longitudinally thereof.

6. A fruit grader comprising a supporting frame, oppositely disposed laterally spaced longitudinally extending grader members having an inner substantially straight vertical side, a longitudinally extending stationary guide of substantially the height of said grader members, the opposite sides of the guide inclining inwardly from the lower outer edge of the same to the top thereof, and said guide being spaced at opposite sides from the grader members, longitudinally extending rolls arranged close to and below the lower outer edges of the base of the guide, a longitudinally movable endless carrier positioned below the rolls and having upwardly extending fingers arranged in the space between the stationary guide and grader members, the said space between the grader members and guide member being of variable width, and means whereby said last mentioned parts may be relatively adjusted laterally.

7. An apparatus of the described class, comprising a supporting frame, a stationary guide carried by said frame and having transversely inclined longitudinally extending upper surfaces, a plurality of independently adjustable grader members supported by said frame and extending longitudinally of the longitudinal side edges of said guide in spaced relation thereto and said guide and grader members being of substantially the same height and in the same horizontal plane, whereby to provide a pair of fruit runways of variable width, a rotatable roll mounted in each of said fruit runways and extending longitudinally thereof in spaced relation to said grader members, an endless conveyer carried by said frame, means carried by said conveyer for projecting into said runways for conveying the fruit longitudinally thereof, and common means for operating said conveyer and for rotating said rolls in a direction toward the longitudinal side edges of said guide.

8. A fruit grader comprising a suitable supporting structure, a fruit runway composed of a fixed longitudinally disposed guide member and an opposing member formed of a series of transversely adjustable end to end grader members held in spaced relation to the fixed member, a longitudinally disposed rotary member situated between the fixed and adjustable member of the fruit runway, and an endless conveyer for conveying the fruit to be graded longitudinally of the fruit runway.

9. A fruit grader having a fruit runway composed of a fixed longitudinally disposed member and an opposed movable longitudinal member held in spaced relation thereto, consisting of a series of transversely adjustable end to end grader members, and rotary means for imparting rotation to the fruit to be graded as moved within the fruit runway.

In testimony whereof I have signed my name to this specification in the presence of two subscribing witnesses.

GEORGE D. PARKER.

Witnesses:
L. E. WOOD,
HARRY A. TOTTEN.